United States Patent [19]

Kato et al.

[11] Patent Number: 5,610,256
[45] Date of Patent: Mar. 11, 1997

[54] METHOD OF PRODUCING AN ULTRA HIGH MOLECULAR WEIGHT POLYMER EMULSION

[75] Inventors: Tadashi Kato, Ibo gun; Takeshi Noguchi, Tuzuki gun; Tadahiro Inada, Tatsuno, all of Japan

[73] Assignee: Showa Highpolymer Co., Ltd., Tokyo, Japan

[21] Appl. No.: 309,610

[22] Filed: Sep. 21, 1994

Related U.S. Application Data

[63] Continuation of Ser. No. 12,368, Feb. 2, 1993, abandoned.

[30] Foreign Application Priority Data

Feb. 4, 1992 [JP] Japan ..................... 4-048075

[51] Int. Cl.$^6$ .................. C08F 20/10; C08F 222/10; C08F 2/00; C08F 4/30
[52] U.S. Cl. ............... 526/318.4; 526/229; 526/233; 526/234; 526/319; 526/325; 526/328; 526/328.5; 524/556; 524/560
[58] Field of Search .................. 526/229, 230, 526/232, 233, 234, 328, 328.5, 329.7, 318.4; 524/319, 556

[56] References Cited

U.S. PATENT DOCUMENTS

| | | | |
|---|---|---|---|
| 4,226,784 | 10/1980 | Yun et al. | 526/229 |
| 4,265,977 | 5/1981 | Kawamura et al. | 523/201 |
| 4,736,005 | 4/1988 | Castner | 526/229 |
| 4,847,342 | 7/1989 | Peiffer | 526/229 |
| 4,877,853 | 10/1989 | Siol et al. | 526/329.7 |
| 4,999,402 | 3/1991 | Yamamoto et al. | 525/305 |
| 5,225,279 | 7/1993 | Redlich et al. | 525/301 |
| 5,371,133 | 12/1994 | Stanley | 524/507 |

FOREIGN PATENT DOCUMENTS

| | | |
|---|---|---|
| 891025 | 9/1953 | Germany. |
| 1301084 | 8/1969 | Germany. |
| 0042703 | 3/1982 | Japan. |

OTHER PUBLICATIONS

"Emulsion Polymerization", Principles of Polymerization 2nd Ed. by Odian, p. 320, John Wiley & Sons, 1981
Surfactants, Chemcyclopedia 92, pp. 139 and 148, ACS Publication, 1992.

*Primary Examiner*—Tae Yoon
*Attorney, Agent, or Firm*—Oblon, Spivak, McClelland, Maier & Neustadt, P.C.

[57] ABSTRACT

An ultra high molecular weight polymer emulsion is produced by emulsion polymerization of a vinyl monomer, wherein the oxygen concentration in the aqueous phase of the reaction system is maintained at a smaller percentage by weight than the percentage by weight of the dissolved oxygen concentration in a 0.5 wt % sodium bisulfite aqueous solution. An emulsifier and a redox polymerization initiator are used for the emulsion polymerization.

7 Claims, No Drawings

METHOD OF PRODUCING AN ULTRA HIGH MOLECULAR WEIGHT POLYMER EMULSION

This application is a Continuation of application Ser. No. 08/012,368, filed Feb. 2, 1993, now abandoned.

BACKGROUND OF THE INVENTION

1. Field of the Invention

The present invention relates to a method of producing a synthetic resin emulsion which can be suitably used in a variety of fields related to paints, adhesives, fibers, paper, civil engineering, etc.

As the synthetic resin emulsion produced by the method of the present invention contains an ultra high molecular weight polymer, films formed from the emulsion, moldings formed from the emulsion and processed products formed by using the films and/or moldings achieve high mechanical characteristics and chemical stability.

2. Discussion of the Background

A number of synthetic resin emulsions containing ultra high molecular polymers have been proposed.

For example, Japanese Patent Publication No. 1-53281 discloses a method of producing an ultra high molecular weight polymer, which method uses an emulsifier and a redox initiator containing 0.001–0.2 parts by weight of either a hydroperoxide or a persulfate per 100 parts by weight of a vinyl monomer having radical-polymerizing activity.

In many of the known methods of producing an ultra high molecular weight polymer emulsions disclosed so far including the above-mentioned method, oxygen in the atmosphere of the reaction system was substantially removed. However, reduction of oxygen concentration in the aqueous phase of the reaction system was not carefully considered in any of the known methods. For example, although some of the known methods may conduct reaction while supplying nitrogen gas through the atmosphere of reaction system, none of them determine the oxygen concentration in the aqueous phase of the reaction system.

As the use of the polymerization initiator must be limited to a very small amount with respect to the amount of the monomer in emulsion polymerization in order to produce an ultra high molecular weight polymer, the reaction proceeds at a slow rate, and the emulsion thus produced is likely to have poor stability. These problems greatly impede the industrial-scale use of the known methods.

To mitigate these problems, emulsion polymerization is carried out in some methods by using large amounts of emulsifiers, that is, 10 wt % or greater with respect to the amounts of the monomer. As a result, the thus-obtained emulsion contains a large amount of an emulsifier. Therefore, when it is used in the production or processing of paints, adhesives, fibers, paper or the like, the large emulsifier content may cause reductions of water resistance and durability of these products such as films, thus failing to achieve the characteristics expected of an ultra high molecular weight polymer emulsion.

An object of the present invention is to provide a method of producing an ultra high molecular weight polymer emulsion which achieves an increased reaction rate and increased stability of the produced ultra high molecular weight polymer emulsion despite using a limited amount of a polymerization initiator and, further, achieves substantially high water resistance and durability of the processed products of the ultra high molecular weight polymer emulsion, such as films, by limiting the use of an emulsifier to small amounts.

SUMMARY OF THE INVENTION

The present invention provides in one aspect, a method of producing an ultra high molecular weight polymer emulsion by emulsion polymerization of a vinyl monomer having radical-polymerizing activity, wherein the oxygen concentration in the aqueous phase of the reaction system is maintained at a smaller percentage by weight than the percentage by weight of the dissolved oxygen concentration in a 0.5 wt % sodium bisulfite aqueous solution at 20° C. under atmospheric pressure, and wherein an emulsifier and a redox initiator are used for said emulsion polymerization, said redox initiator containing a hydroperoxide, a reducing agent, an activating agent and a chelating agent or alternatively containing a persulfate, a reducing agent and an activating agent, the amount of said hydroperoxide or said persulfate being 0.001–0.2 part by weight per 100 parts by weight of the monomer.

Further the present invention provides in another aspect, a method of producing an ultra high molecular weight polymer emulsion described above wherein said emulsifier has radical-polymerizing activity.

DETAILED DESCRIPTION OF THE INVENTION

Examples of the vinyl monomer having radical-polymerizing activity used in the method of the present invention are: diene compounds such as butadiene and isoprene; aromatic alkenyl compounds such as styrene, α-methylstyrene and methylstyrene; methacrylic acid esters such as methyl methacrylate and ethyl methacrylate; acrylic acid esters such as methyl acrylate, ethyl acrylate and butyl acrylate; acrylonitrile; methacrylonitrile; vinyl esters such as vinyl acetate; vinyl chloride; unsaturated acids such as acrylic acid, methacrylic acid and itaconic acid; and acrylamide, and one of such monomers alone or a combination of any of the monomers may be used.

The redox polymerization initiator used in the method the present invention contains a hydroperoxide or a persulfate as an essential component. The amount of the hydroperoxide or the persulfate should be in a range between 0.001 and 0.2 parts by weight, and more preferably, between 0.01 and 0.1 parts by weight per 100 parts by weight of the vinyl monomer having radical-polymerizing activity. If the amount of the hydroperoxide or persulfate used is less than 0.001 parts by weight, it will take a long time to complete the polymerization, or incomplete polymerization may result the amount is greater than 0.2 parts by weight, the polymerization degree of the polymer will be reduced to an unsuitable level.

Examples of the hydroperoxide used in the method of the present invention are: cumene hydroperoxide, t-butyl hydroperoxide, diisopropylbenzene hydroperoxide, p-menthane hydroperoxide, 1,1,3,3-tetramethylbutyl hydroperoxide, and 2,5-dimethylhexane-2,5-dihydroperoxide. Examples of the persulfate are potassium persulfate and ammonium persulfate.

Examples of the reducing agent contained in the redox polymerization initiator in accordance with the present invention are: glucose, dextrose, formaldehyde sodium sulfoxylate, and sodium thiosulfate. Examples of the activating agent are: ferrous sulfate, copper sulfate, and potassium hexacyanoferrate (II). Examples of the chelating agent are: sodium pyrophosphate, and ethylenediamine tetraacetic acid. The amounts of these agents are suitably determined in accordance with the combination of the initiator.

Preferred initiators are a redox initiator consisting of hydroperoxide, ferrous sulfate, a reducing agent (e.g., glucose, dextrose or formaldehyde sodium sulfoxylate) and a chelating agent (e.g., ethylenediamine tetraacetic acid) and a redox initiator consisting of a persulfate, sodium thiosulfate and copper sulfate.

The emulsifier may be either an anionic emulsifier or a nonionic emulsifier that has been conventionally used. The amount of the emulsifier should be in a range between 0.5 and 5 parts by weight, and more preferably, between 0.5 and 3 parts by weight per 100 parts by weight of the vinyl monomer.

Use of less than 0.5 parts by weight of the emulsifier per 100 parts by weight of the monomer will reduce the reaction rate and the stability of the produced emulsion.

Use of greater than 5 parts by weight of the emulsifier per 100 parts by weight of the monomer will result in reduced water resistance, and deteriorated mechanical and chemical characteristics of the products, such as dried films, formed by using the obtained emulsion.

In general, if the amount of a polymerization initiator is very small and the emulsion particles consisted of ultra high molecular weight polymers, the emulsions will likely have reduced mechanical and chemical stability and, further, the dried films formed from the emulsions will likely be irregular having cracks and craters. However, use of an emulsifier having radical-polymerizing activity eliminates these problems, thereby achieving good stability of the emulsion and good mechanical and chemical characteristics of the dried films formed from the emulsion.

Examples of the emulsifier having radical-polymerizing activity are shown below:

acidic phosphoric acid methacryloxy polyethylene-glycol ester;

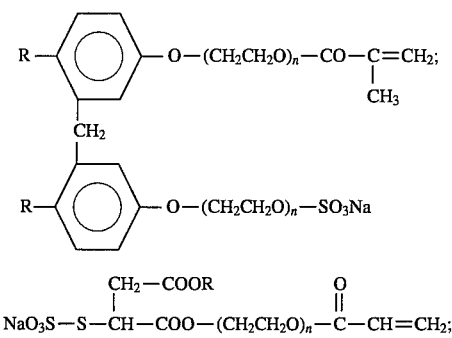

$$NaO_3S-S-\overset{CH_2-COOR}{\underset{|}{CH}}-COO-(CH_2CH_2O)_n-\overset{O}{\underset{\|}{C}}-CH=CH_2;$$

and

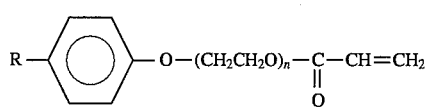

(where R is an alkyl group, and n is an integer generally in a range between 2 and 20.)

The amount of an emulsifier as mentioned above should be in a range between 0.5 and 5 parts by weight per 100 parts by weight of the monomer.

To achieve a relatively high reaction rate and a stable emulsion despite limiting the use of a redox polymerization initiator and an emulsifier to very small amounts, the reaction must be conducted under conditions where the oxygen concentration in the aqueous phase of the reaction system is lower than the dissolved oxygen concentration in the 0.5 wt % sodium bisulfite aqueous solution at 20° C. under atmospheric pressure.

The thus required level of dissolved oxygen concentration in the aqueous phase of the reaction system is of a degree that is hard to achieve by simply sweeping the reaction system with nitrogen gas. In order to achieve this low concentration of dissolved oxygen, a reaction system may be bubbled conveniently with nitrogen gas.

If the dissolved oxygen concentration is greater than the required level, use of increased amounts of the redox polymerization initiator and/or the emulsifier will be inevitably required or promoting polymerization, thus reducing molecular weights of the resulting polymers, reducing stability of the emulsion, and deteriorating mechanical and chemical characteristics of the films formed from the emulsion.

To conduct the reaction, for example, an emulsifier and water are put in the reactor. Separately, predetermined amounts of a monomer and water are emulsified with a predetermined amount of an emulsifier, and put in a dropping funnel. Components of the radox polymerization initiator are also charged in other dropping funnels. Oxygen is removed from both the reactor and the dropping funnels by bubbling nitrogen gas therein. The dissolved oxygen concentration in the aqueous phase in the reaction system is determined by, for example, using a dissolved oxygen concentration meter (Toa Denpa Kogyo Co.) whose oxygen concentration indication has been calibrated to 0 ppm while the electrodes are being dipped in the 0.5 wt % sodium bisulfate aqueous solution at 20° C. under atmospheric pressure.

When it is observed that the dissolved oxygen concentrations both in the aqueous phase of the reactor and in the dropping funnel have been reduced to zero or lower according to the above mentioned oxygen concentration meter, dropping of the monomer emulsion and the initiator components to the reaction system is started while bubbling of nitrogen gas is continued.

A part of the monomer or a part of the redox polymerization initiator components can be charged in the reactor or the monomer emulsion in advance, however, it is noted that oxidant components and reducing components of the redox polymerization initiator should be separated each other until dropping and mixing of the reaction components start.

The reaction temperature may be freely selected as long as the temperature allows the redox initiator to decompose. However, because the amount of the redox initiator is small, the temperature should preferably be 50° C. or lower, and more preferably, 30° C. or lower.

According to the present invention, if an emulsifier having radical-polymerizing activity is used to form a polymer, the molecular weight of the polymer cannot accurately be determined because the polymer barely dissolves in conventional solvents and thus forms a large amount of gel therein. However, if an emulsifier having no radical-polymerizing activity is used, the molecular weight of the polymer can be determined because the polymer is soluble in conventional solvents. In the Examples described below, the molecular weights of polymers were determined by using a gel-permeation chromatograph (GPC) with a tetrahydrofuran solvent and by determining [η] in a toluene solvent. The weight average molecular weight of the obtained polymer was generally 8 million or greater, and [η] was 10 dl/g or greater.

According to the present invention, because the dissolved oxygen concentration in the aqueous phase of the reaction system is maintained at a very low level (equal to or less than the dissolved oxygen concentration in the 5 wt % sodium bisulfite aqueous solution at 20° C. under atmospheric pressure), a stable emulsion can be produced despite limiting the use of a redox polymerization initiator and an emulsifier to very small amounts. The dried films formed from the emulsion produced by the method of the present invention achieve good mechanical and chemical characteristics.

The reason why production of a stable emulsion is possible is probably because the limited amount of the initiator is fully used for polymerization without being wasted by side reactions, due to the substantial elimination of dissolved oxygen. Another reason may be the limited use of the emulsifier, which is made possible also by the substantial elimination of dissolved oxygen.

The reason why good characteristics of the dried films formed from the emulsion can be achieved is probably because the emulsions contain ultra high molecular weight polymers due to the limited use of the redox polymerization initiator and the emulsifier.

The films formed from an emulsion produced by using an emulsifier having radical-polymerizing activity is insoluble in a solvent due to gellation (microgells) occurred inside the thus-produced emulsion particles.

EXAMPLES

Methods of the present invention are illustrated with reference to the following examples, but the invention is not intended to be limited only to these examples.

[Example 1]

1.5 g of sodium methacryloxy polyethyleneglycol-2-ethylhexylsulfosuccinate (the polymerization degree of polyethylene glycol=15) (referred to as "Emulsifier A"), 0.002 g of ferrous sulfate, 0.01 g of sodium ethylenediaminetetraacetate and 200 g of water were put in a 1-liter flask equipped with a stirrer, a thermometer, a condenser, three dropping funnels, a nitrogen gas duct and electrodes of an oxygen concentration meter. The oxygen concentration in the reaction solution contained in the flask is generally 5–10 ppm.

466 g of 2-ethylhexylacrylate, 10 g of methacrylic acid, 1.5 g of Emulsifier A and 228 g of water were put in a 1-liter beaker and then emulsified by using a Homomixer, thus obtaining a monomer emulsion.

Nitrogen gas was bubbled in both the contents of the flask and the monomer emulsion in the beaker at rates of 50–100 ml/min. for about 2 hours, thus reducing the respective dissolved oxygen concentrations to zero. (The dissolved oxygen concentration meter had been calibrated so as to indicate zero while dipping the electrodes in a 0.5 wt % sodium bisulfite aqueous solution at 20° C. under atmospheric pressure.) When the oxygen concentration in both the flask and the monomer emulsion were observed to be zero or lower, a mixture of the monomer emulsion, 20 g of 0.3 wt % t-butylhydroperoxide aqueous solution and 20 g of 0.7 wt % formaldehyde sodium sulfoxylate aqueous solution were separately dropped through three dropping funnels into the reaction solution contained in the flask. This dropping process took 3 hours. During this process, the temperatures of the reaction solution was maintained at 32°±2° C. After the dropping process, the temperature of the obtained emulsion was continuously maintained at the same level for aging. After cooling, 5 g of 25 wt % ammonia water solution was added to neutralize the emulsion in the flask.

[Example 2]

Polymerization was conducted under substantially the same conditions as in Example 1, except that 0.001 g copper sulfate was used instead of the combination of ferrous sulfate and sodium ethylenediamine tetraacetate and in that a combination of 20 g of 0.5 wt % potassium persulfate aqueous solution and 10 g of 1 wt % sodium thiosulfate was used instead of the combination of t-butylhydroperoxide aqueous solution and formaldehyde sodium sulfoxylate aqueous solution.

[Example 3]

Polymerization was conducted under substantially the same conditions as in Example 1, except that a combination of 20 g of 0.5 wt % cumene hydroperoxide aqueous solution and 20 g of 1 wt % glucose aqueous solution was used instead of the combination of 20 g of 0.3 wt % t-butylhydroperoxide aqueous solution and 20 g of 0.7 wt % formaldehyde sodium sulfoxylate aqueous solution.

[Example 4]

Polymerization was conducted under substantially the same conditions as in Example 1, except that 1.5 g of acidic phosphoric acid-methacryloxy polyethyleneglycol ester (Newfrontier A-299E made by Dai-ichi Kogyo Seiyaku Co. LTD.) was used instead of 1.5 g of Emulsifier A.

[Example 5]

Polymerization was conducted under substantially the same conditions as in Example 1, except that a combination of 2 g of sodium dodecylbenzenesulfonate and 20 g of lauryl polyoxyethyleneglycol ether (the polymerization degree of ethylene glycol being 50) was used as an emulsifier instead of Emulsifier A.

[Comparative Example 1]

The reaction was started when the oxygen concentrations in the reaction solution and the monomer emulsion were observed to be −0.2 ppm and +0.5 ppm, respectively. About 30 minutes after dropping was started, heat generation ceased, and the monomers remained unreacted. Thus, the reaction did not complete.

[Comparative Example 2]

1.5 g of the Emulsifier A, and 200 g of water were put in a 1-liter flask equipped with a stirrer, a thermometer, a condenser and dropping funnels. The oxygen concentration in the reaction solution in the flask was generally 5–10 ppm.

466 g of 2-ethylhexylacrylate, 10 g of methacrylic acid, 1.5 g of Emulsion A and 228 g of water were put in a 1-liter beaker and then emulsified by using a Homomixer, thus obtaining a monomer emulsion.

The monomer emulsion, 20 g of 10 wt % ammonium persulfate aqueous solution, 20 g of 6 wt % sodium bisulfite aqueous solution were dropped into the reaction solution contained in the flask. This dropping process took 3 hours. During this process, the temperatures of the reaction solution were maintained at 40° C. Only gaseous atmosphere of the reaction system was swept with nitrogen gas for 30 minutes. After the dropping completed, the temperature of the obtained emulsion was maintained at the same level for aging. After cooling, 5 g of 25 wt % ammonia water was added to neutralize the emulsion in the flask.

The properties of the obtained emulsions and the properties of the films formed thereof are shown in Table 1.

By the method of the present invention, an ultra high molecular weight polymer was produced by emulsion polymerization in which the reaction rate was maintained at a relatively high level despite using very small amounts of a redox polymerization initiator and/or an emulsifier.

As the obtained polymers have ultra high molecular weights, and dried films or the like formed of the polymers contain only small amounts of the emulsifiers, they achieve high water resistance and good mechanical and chemical characteristics.

If an emulsifier having radical-polymerizing activity is used to produce an ultra high molecular weight polymer emulsion, the emulsion achieves good film-forming characteristics, and further, a dried film insoluble in generally-used solvents can be obtained, achieving good mechanical characteristics and chemical stability. Thus, an emulsion produced by the method of the present invention can be suitably used in a variety of fields related to paints, adhesives, fiber processing agents, paper processing agents, civil engineering, etc.

What is claimed is:

1. A method of producing a high molecular weight polymer emulsion by emulsion polymerization of an acrylic ester or methacrylic ester or a mixture thereof, optionally with an unsaturated carboxylic acid, wherein the oxygen concentration in the aqueous phase of a reaction system is maintained at zero or less as measured relative to the dissolved oxygen concentration in a 0.5 wt. % sodium bisulfite aqueous solution at 20° C. under atmospheric pressure, and wherein an emulsifier, present in an amount of 0.5–5 parts by weight per 100 parts by weight of said monomer, and a redox polymerization initiator are used for said emulsion polymerization, said redox polymerization initiator containing a persulfate, a reducing agent and activating agent, the amount of said persulfate being 0.001–0.2 parts by weight per 100 parts by weight of the monomer.

2. A method of producing a high molecular weight polymer emulsion according to claim 1, wherein said emulsifier has radical-polymerizing activity.

3. A method of producing a high molecular weight polymer emulsion according to claim 2, wherein said emulsifier is a phosphoric acid ester emulsifier having radical-polymerizing activity.

4. A method of producing a high molecular weight polymer emulsion by emulsion polymerization of an acrylic ester or methacrylic ester or a mixture thereof, optionally with an unsaturated carboxylic acid, wherein the oxygen concentration in the aqueous phase of a reaction system is maintained at zero or less as measured relative to the dissolved oxygen concentration in a 0.5 wt. % sodium bisulfite aqueous solution at 20° C. under atmospheric pressure, and

TABLE 1

|  | EX. 1 | EX. 2 | EX. 3 | EX. 4 | EX. 5 | Comparative EX. 1 | EX. 2 |
|---|---|---|---|---|---|---|---|
| Emulsion properties |  |  |  |  |  |  |  |
| Concentration (%) | 50.1 | 51.1 | 49.8 | 50.1 | 51.1 | No polymer | 50.5 |
| pH | 7.6 | 8.0 | 7.1 | 6.5 | 8.1 |  | 7.3 |
| Viscosity (cp) | 800 | 410 | 1600 | 3100 | 510 |  | 2100 |
| CaCl$_2$ compatibility *1 | o | ⊙ | o | ⊙ | x |  | ⊙ |
| Film properties |  |  |  |  |  |  |  |
| Polyken-tack (g) *2 | 280 | 210 | 290 | 190 | 170 |  | 490 |
| Rupture strength (kg/cm$^2$) *3 | 1.0 | 1.1 | 1.0 | 1.6 | 1.2 |  | 0.2 |
| Rupture Strength (kg/cm$^2$) (Zn-neutralized) *4 | 8.6 | 9.6 | 10.2 | 12.6 | 8.5 |  | 2.1 |
| Water resistance (%) *5 | 10.1 | 12.1 | 9.5 | 6.1 | 12.1 |  | 45.6 |
| Molecular weight *6 (Mw × 10$^{-6}$) | Insoluble | Insoluble | Insoluble | Insoluble | 8.5 |  | 1.05 |

Note:
*1 CaCl$_2$ compatibility was checked by mixing 2 ml of 25% CaCl$_2$.2H$_2$O with 100 g of each emulsion.
*2 10 mm/min. 1S (ASTM D 2979)
*3 Chuck gap was 10 mm, and the elongating rate was 100 mm/min.
*4 50% of the methacrylic acid was neutralized by Zn++.
*5 Water absorption determined when the films were dipped in water at 20° C. for 24 hours.
*6 GPC with THF solvent.

wherein an emulsifier, present in an amount of 0.5–5 parts by weight per 100 parts by weight of said monomer, and a redox polymerization initiator are used for said emulsion polymerization, said redox polymerization initiator containing a hydroperoxide, a reducing agent, an activating agent and chelating agent, the amount of said hydroperoxide being 0.001–0.2 parts by weight per 100 parts by weight of the monomer.

5. A method of producing a high molecular weight polymer emulsion according to claim 4, wherein said emulsifier has radical-polymerizing activity.

6. A method of producing a high molecular weight polymer emulsion according to claim 5, wherein said emulsifier is a phosphoric acid ester emulsifier having radical-polymerizing activity.

7. A method of producing a high molecular weight polymer emulsion according to claim 4, wherein said chelating agent comprises ethylenediaminetetraacetic acid.

\* \* \* \* \*